(12) United States Patent
Russo et al.

(10) Patent No.: US 8,972,679 B2
(45) Date of Patent: Mar. 3, 2015

(54) STORAGE DEVICE IN A LOCKED STATE (75) Inventors: Leonard E Russo, Tomball, TX (US);
Valiuddin Y Ali, Cypress, TX (US);
Walter A Gaspard, Magnolia, TX (US);
Christoph J Graham, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 226 days.

(21) Appl. No.: 13/639,508

(22) PCT Filed: Apr. 12, 2010

(86) PCT No.: PCT/US2010/030719
§ 371 (c)(1),
(2), (4) Date: Oct. 4, 2012

(87) PCT Pub. No.: WO2011/129807
PCT Pub. Date: Oct. 20, 2011

(65) Prior Publication Data
US 2013/0024638 A1    Jan. 24, 2013

(51) Int. Cl.
*G06F 12/00* (2006.01)
*G06F 21/31* (2013.01)
*G06F 21/78* (2013.01)

(52) U.S. Cl.
CPC ............... *G06F 21/31* (2013.01); *G06F 21/78* (2013.01); *G06F 2221/2105* (2013.01); *G06F 2221/2129* (2013.01); *G06F 2221/2137* (2013.01)

USPC ............... 711/163; 711/115; 726/27; 726/35

(58) Field of Classification Search
USPC ............... 711/115, 163; 726/27, 35
See application file for complete search history.

(56) References Cited

U.S. PATENT DOCUMENTS

| 7,043,581 | B1 | 5/2006 | Gulick |
| 8,539,572 | B2 * | 9/2013 | Challener et al. ............... 726/17 |
| 2007/0037454 | A1 * | 2/2007 | Bushby ........................ 439/680 |
| 2008/0005409 | A1 | 1/2008 | Kolokowsky et al. |
| 2008/0082761 | A1 | 4/2008 | Herness et al. |
| 2009/0216982 | A1 | 8/2009 | Johnson |

OTHER PUBLICATIONS

ISA/KR, International Search Report mailed Jan. 17, 2011, PCT/US2010/030719 filed Apr. 12, 2010.

* cited by examiner

*Primary Examiner* — Jared Rutz
*Assistant Examiner* — Mehdi Namazi
(74) *Attorney, Agent, or Firm* — Hewlett-Packard Patent Department (57) ABSTRACT A method for managing a storage device including identifying a lock timing for the storage device when coupling to a device, transitioning the storage device into a locked state in response to detecting the storage device decoupling from the device, and configuring the storage device to remain in the locked state if the storage device is re-coupled to the device after the lock timing has elapsed.

15 Claims, 8 Drawing Sheets

STORAGE DEVICE IN A LOCKED STATE

BACKGROUND

When managing a storage device, a user can access the storage device through one or more input devices of a computing machine. The user can then utilize one or more of the input devices to configure the computing machine to allow or restrict access to the storage device. Additionally, the user can physically access the storage device and couple and/or decouple the storage device from the computing machine.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the embodiments.

DETAILED DESCRIPTION

Figure 1:
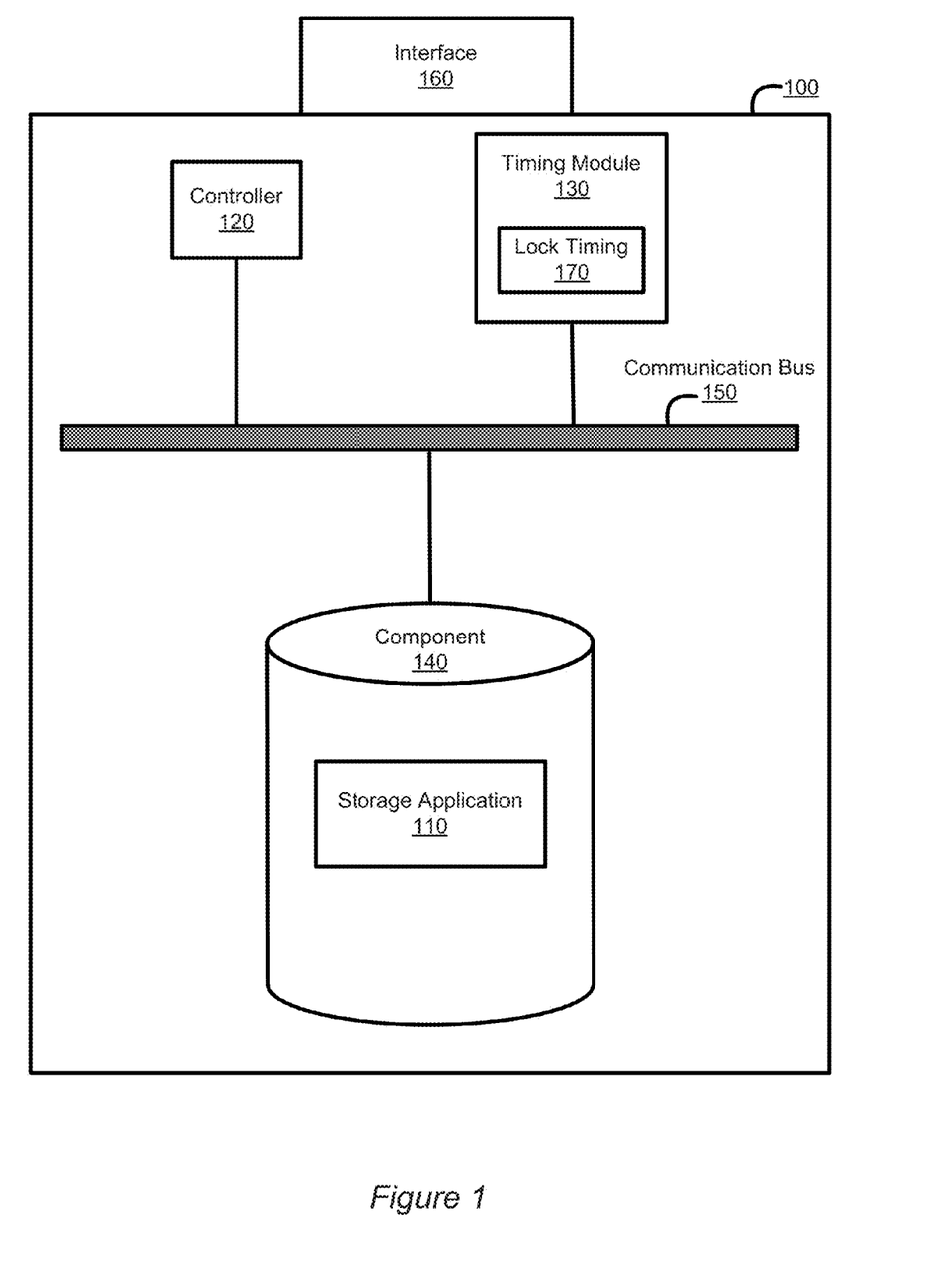
FIG. 1 illustrates a storage device coupled to a timing module according to an embodiment of the invention.

FIG. 1 illustrates a storage device 100 coupled to a timing module 130 according to an embodiment of the invention. In one embodiment, the storage device 100 is an internal storage device 100 included in a device. In another embodiment, the storage device 100 can be an external storage device 100 which can couple to a device and interface with the device through one or more ports of the device.

As illustrated in FIG. 1, the storage device 100 is coupled to an interface 160, a controller 120, a timing module 130, a component 140, and a communication bus 150 for the storage device 100 and/or one or more components of the storage device 100 to communicate with one another. In one embodiment the communication bus 150 is a memory bus. In other embodiments, the communication bus 150 is a data bus. Further, as illustrated in FIG. 1, the component 140 of the storage device 100 stores a storage application 110. In other embodiments, the storage device 100 includes additional components and/or is coupled to additional components in addition to and/or in lieu of those noted above and illustrated in FIG. 1.

As noted above, the storage device 100 includes a controller 120. The controller 120 sends data and/or instructions to one or more components of the storage device 100, such as the interface 160, the component 140, the timing module 130, and the storage application 110. Additionally, the processor 120 receives data and/or instruction from components of the storage device 100, such as the interface 160, the timing module 170, and the storage application 110.

The storage application 110 is an application which can be configured by the controller 120 to manage the storage device 140 by granting or restricting access to the storage device 140. When managing the storage device 100, the storage application 110 can identify a lock timing for the storage device 100 in response to an interface 160 of the storage device coupling to a device. For the purposes of this application, a device can be any component, device, or computing machine which can interface and couple with the storage device 100.

The storage device 100 is a device and/or component which can be configured to store one or more content. Additionally, the storage device 100 can couple and decouple from one or more devices. Further, the storage device 100 can be configured by the controller 120 and/or the storage application 110 to transition into a locked state in response to detecting the storage device 100 decoupling from a device.

When in a locked state, access to the storage device 100 and one or more content on the storage device 100 can be denied and/or restricted by the controller 120 and/or the storage application 110. Additionally, when the storage device 100 is in a locked state, the storage device 100 and/or one or more content on the storage device 100 can be encrypted.

Once decoupled from the device, a timing module 130 of the storage device 100 is configured to count up to the lock timing 170. For the purposes of this application, the lock timing 170 represents a value or an amount of time for the timing module 130 to count up to. If the timing module 130 counts up to the lock timing 170 and the storage device 100 has not re-coupled to the device, the controller 120 and/or the storage application 110 can configure the storage device 100 to remain in the locked state.

In another embodiment, if the storage device 100 re-couples to the device before the lock timing 170 has elapsed, the controller 120 and/or the storage application 110 can configure the storage device 100 to transition into an unlocked state. When in the unlocked state, access to the storage device 100 and/or one or more content in the storage device 100 can be allowed or granted by the controller 120 and/or the storage application 110.

The storage application 110 can be firmware which is embedded onto the storage device 100 or a device. In another embodiment, the storage application 110 is a software application stored on the storage device 100 within a ROM or on the component 140 accessible by the storage device 100. In other embodiments, the storage application 110 is stored on a computer readable medium readable and accessible by the storage device 100.

Additionally, as noted above, in one embodiment, the storage device 100 is included in a device. In other embodiments, the storage device 100 is not included in a device, but is accessible to the device utilizing a network interface or a communication device of the device. In other embodiments, the storage device 100 can be configured to couple to one or more ports or interfaces on the device wirelessly or through a wired connection.

As noted above, the controller 120 and/or the storage application 110 can manage the storage device 100 by restricting and/or granting access to the storage device 100 in response to the storage device 100 coupling to or decoupling from a device. The storage device 100 can couple to a device through an interface 160 of the storage device 100. The interface 160 is a component of the storage device 100 configured to engage one or more ports or communication channels on the device.

Additionally, the interface 160 can couple with the device through a wireless and/or through a wired connection. In one embodiment, the interface 160 includes at least one from the group consisting of an IDE interface, a SATA interface, a SAS interface, a PCIe interface, an ESATA interface, a USB interface, a firewire interface, and/or a serial interface. In another embodiment, the interface 160 can be or include a wireless component configured to interface and communicate with the device through a wireless connection.

In one embodiment, when the storage device 100 couples to a device a first time, the storage device 100 can initially be in the locked state and access to the storage device 100 can initially be restricted. Further, the storage application can prompt the device to authenticate the storage device 100. When authenticating the storage device 100, an authentication module of the device can be configured to authenticate the storage device 100 with the device. The authentication module is a hardware and/or software device configured to verify an identity of the device.

In one embodiment, when authenticating the storage device 100, the authentication module can decrypt an encryption of the storage device. The authentication module can decrypt an encryption using a sequence of characters or numbers and/or using one or more algorithms. In another embodiment, the authenticate module can authenticate the storage device 100 with the device using one or more signatures. In other embodiments, the authentication module can use a software and/or hardware token to authenticate the storage device 100 with the device.

Once the storage device 100 has been authenticated, a lock timing 170 for the storage device 100 can be identified. As noted above, the lock timing 170 is a value and/or a time used by the controller 120 and/or the storage application 110 when configuring a timing module 130. Additionally, the lock timing 170 can be received from the device or from one or more components of the storage device 100.

The lock timing 170 can be defined by the device and/or by a user accessing the device. In another embodiment, the lock timing 170 can be predefined by the storage device 100 and/or by a timing module 130 of the storage device 100. Additionally as shown in FIG. 1, the lock timing 170 can be stored on a timing module 130. In other embodiments, the lock timing 170 can be stored on additional locations in addition to and/or in lieu of those noted above and illustrated in FIG. 1.

When configuring a timing module 130 with the lock timing 170, the controller 120 and/or the storage application 110 can instruct the timing module 130 to begin counting up to the lock timing in response to the storage device 100 decoupling from the device. A timing module 130 is a component or device of the storage device 100 which can be configured by the controller 120 and/or the storage application 110 to identify and/or track an amount of time the storage device 100 is decoupled from the device. Additionally, the controller 120 and/or the storage application 110 can instruct the timing module 130 to notify the controller 120 and/or the storage application 110 once the timing module 130 has counted up to the lock timing 170.

Once the timing module 130 has identified a lock timing 170 for the storage device 100, the controller 120 and/or the storage application 110 can poll the interface 160 to detect the storage device 100 decoupling from the device. In one embodiment, the storage device 100 decouples from the device when a connection is broken or severed between the interface of the storage device 100 and the device.

When determining whether a connection is broken or severed, the controller 120 and/or the storage application 110 can poll the interface 160 and/or one or more components of the storage device 100 for a broken link signal. In another embodiment, the controller 120 and/or the storage application 110 can monitor the connection for any disconnections.

If the controller 120 and/or the storage application 110 detect the storage device 100 decoupling from the device, the storage application 110 can configure the storage device 100 to enter into the locked state and access to the storage device 100 can be restricted. In one embodiment, when restricting access to the storage device 100, the controller 120 and/or the storage application 110 can configure the interface 160 or one or more components of the storage device 100 to enter a disconnected state such that the device can not establish a connection with the storage device 100.

Additionally, the controller 120 and/or the storage application 110 can configure one or more components of the storage device 100 to power down. In another embodiment, the controller 120 and/or the storage application 110 can send one or more signals and/or instructions to the device indicating that the storage device 100 is not ready for use. In other embodiments, one or more of the signals and/or instructions can indicate that the storage device 100 needs to be authenticated before it can be accessed and/or used.

Once the storage device 100 has transitioned into the locked state, the controller 120 and/or the storage application 110 can access the timing module 130 and instruct the timing module 130 to begin counting up to the lock timing 170. While the timing module 130 is incrementing or counting up to the lock timing 170, the controller 120 and/or the storage application 110 will poll the interface 160 to scan for the storage device 100 re-coupling to the device.

In one embodiment, if the timing module 130 has counted up to the lock timing 170, the timing module 130 will send a signal to the controller 120 and/or the storage application indicating that the lock timing 170 has elapsed. In response to the lock timing 170 elapsing, the controller 120 and/or the storage application 110 can configure the storage device 100 to remain in the locked state. Additionally, if the controller 120 and/or the storage application 110 determine that the storage device 100 has re-coupled to the device after the lock timing 170 has elapsed, the storage application 110 can send a signal for the device to re-authenticate the storage device 100 before the storage device 100 and/or content on the storage device 100 can be accessed.

In other embodiments, if the controller 120 and/or the storage device 110 have not received the signal indicating that the lock timing has elapsed 170 and the controller 120 and/or the storage application 110 have detected that the interface 160 has re-coupled to the storage device 100, the storage application 110 can configure the storage device 100 to transition from the locked state to the unlocked state. When transitioning from the locked state to the unlocked state, the storage application 110 can instruction one or more of the components of the storage device 100 to grant access to the device and resume communication with the device.

Figure 2:
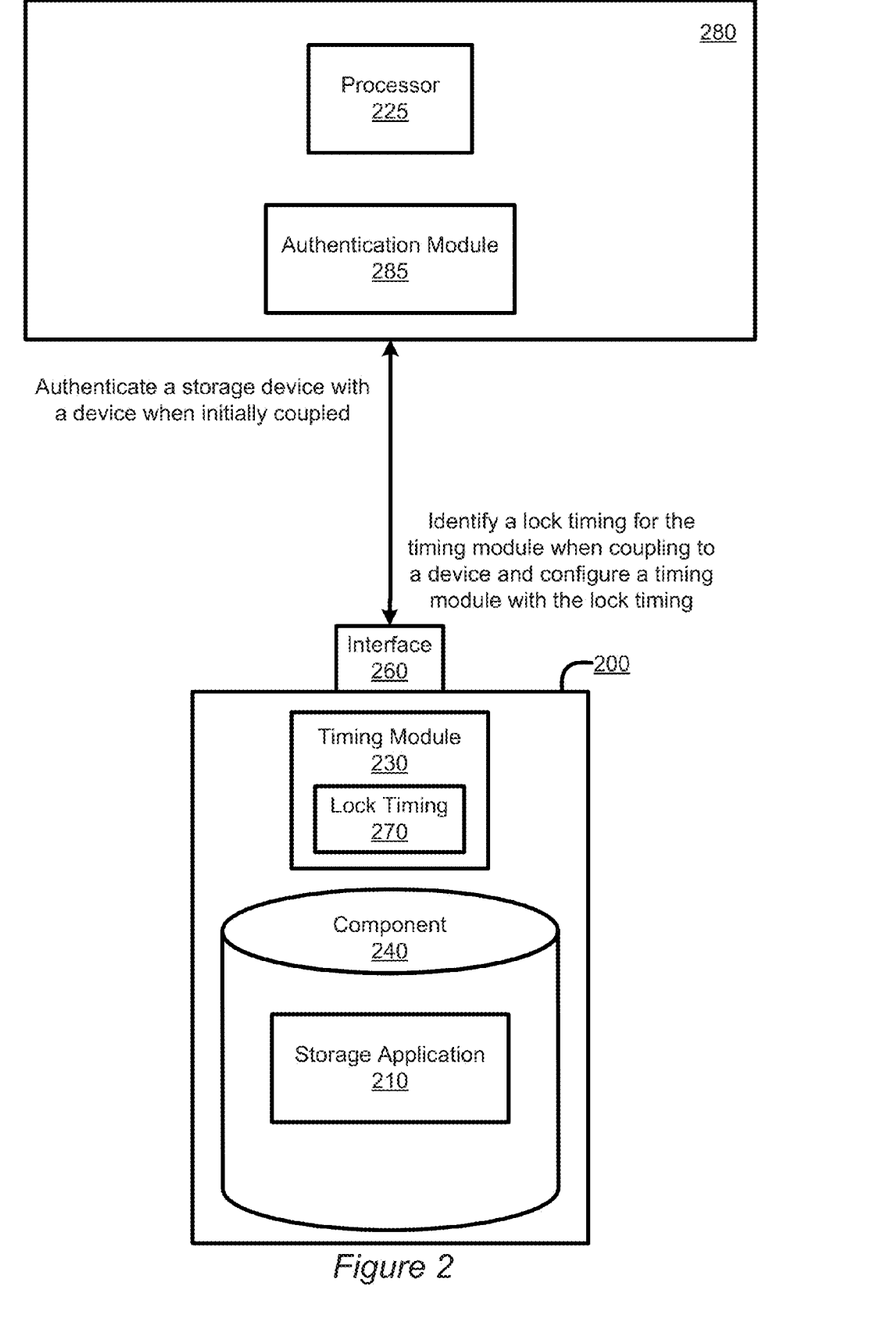
FIG. 2 illustrates a storage device coupling to a device according to an embodiment of the invention.

FIG. 2 illustrates a storage device 200 coupling to a device 280 according to an embodiment of the invention. As noted above, the device 280 can be any device and/or component which can couple with the storage device 200 and interface with the storage device 200 through one or more ports of the device 280.

In one embodiment, the device 280 is a computing machine. The computing machine can include as a desktop, a laptop, and/or a server. In another embodiment, the device 280 is or can include a cellular device and/or a media device. In other embodiments, the device 280 can be or include additional devices and/or components configured to couple and interface with the storage device 200.

As illustrated in FIG. 2, the storage device 200 can couple with the device 280 and interface with the device 280 through an interface 260 of the storage device 200. In one embodiment, as shown in the present embodiment, the interface 260 can protrude and extend from the storage device 200. The interface 260 can include an IDE interface, a SATA interface, a SAS interface, a PCIe interface, a USB interface, a ESATA interface, a firewire interface, serial interface, a network interface, and/or a wireless device. In other embodiments, the interface 260 can include additional devices and/or components configured to coupled and interface the storage device 200 with the device 280 in addition to and/or in lieu of those noted above.

When coupling and interfacing with the device 280, the interface 260 can engage one or more ports of the device 280 when coupling the storage device 200 to the device 280. One or more of the ports of the device 280 can be communication ports which can engage and couple with the interface 260. In one embodiment, one or more of the ports of the device 280 can include an IDE port, a SATA port, a SAS port, a PCIe port, a USB port, an ESATA port, a firewire port, a serial port, a network port, and/or a wireless device. In other embodiments, one or more of the ports can include additional devices and/or components configured to coupled and engage the device 280 with the storage device 200 in addition to and/or in lieu of those noted above.

Additionally, as noted above, when the storage device 200 is initially being accessed by the device 280, the storage device 200 can initially be in a locked state. A locked state is a state of the storage device 200 where access to the storage device 200 and one or more content on the storage device 200 is restricted. When in a locked state, one or more components of the storage device 200 can be powered down or in a sleep state. In another embodiment, when the storage device 200 is in a locked state, one or more of the components can be configured to reject communication with a device 280 or deny access with the device 280 until the storage device 200 has been authenticated.

Additionally, when the storage device 200 is in the locked state, the storage device 200 can additionally be encrypted. The encryption can be generated using one or more encryption algorithms and can include one or more sequence of numbers and/or characters. In another embodiment, the encryption can include one or more signatures.

As shown in FIG. 2, in response to the storage device 200 coupling to the device 280 a first time, a storage application 210 launched from a component 240 of the storage device 200 can prompt the device 280 to authenticate the storage device 200. As noted above, an authentication module 285 of the device 280 can be utilized to authenticate the storage device 200. The authentication module 285 can be a software and/or hardware device configured to verify an identity of storage device 200 to the device 280. In another embodiment, the authentication module 285 can verify an identity of the device 280 to the storage device 200.

The authentication module 285 can authenticate the storage device 280 by decrypting the storage device 200. When decrypting the storage device 200, the authentication module 285 can utilize one or more keys, one or more decryption algorithms, and/or one or more sequence of numbers and/or characters. In other embodiments, the authentication module 285 can authenticate the storage device 200 utilizing additional methods in addition to and/or in lieu of those noted above.

Once the storage device 200 has been decrypted and authenticated, the storage device 200 can enter an unlocked state. As noted above, when in the unlocked state, access to the storage device 200 and one or more content on the storage device 200 can be granted. Additionally, when in the unlocked state, the storage application 210 can instruct one or more components of the storage device to grant access to the device 280 and communicate with the device 280.

As illustrated in FIG. 2, once the storage device 200 has entered into the unlocked state, the storage application 210 can proceed to identify a lock timing 270 for a timing module 230. As noted above, the lock timing 270 corresponds to an amount of time which a timing module 230 of the storage device 200 will count up to in response to the storage device 200 de-coupling from the device 280. In one embodiment, the lock timing 270 can be predefined by the storage application 210 or the timing module 230. In another embodiment, the lock timing 270 can be defined by the device 280 and/or by a user accessing the device 280. Additionally, the lock timing 270 can be updated and/or modified by the timing module 230, the storage device 200, the device 280, a user, and/or an administrator.

The lock timing 270 can be sent to the timing module 230 in response to the storage device 200 initially coupling to the device 280. The storage application can store the lock timing 270 on the timing module 230 and configure the timing module 230 using the lock timing 270. In other embodiments, the lock timing 270 can be stored and accessed by the timing module 230 from additional locations on the storage device 200 and/or the device 280 in addition to and/or in lieu of those noted above and illustrated in FIG. 2.

Figure 3:
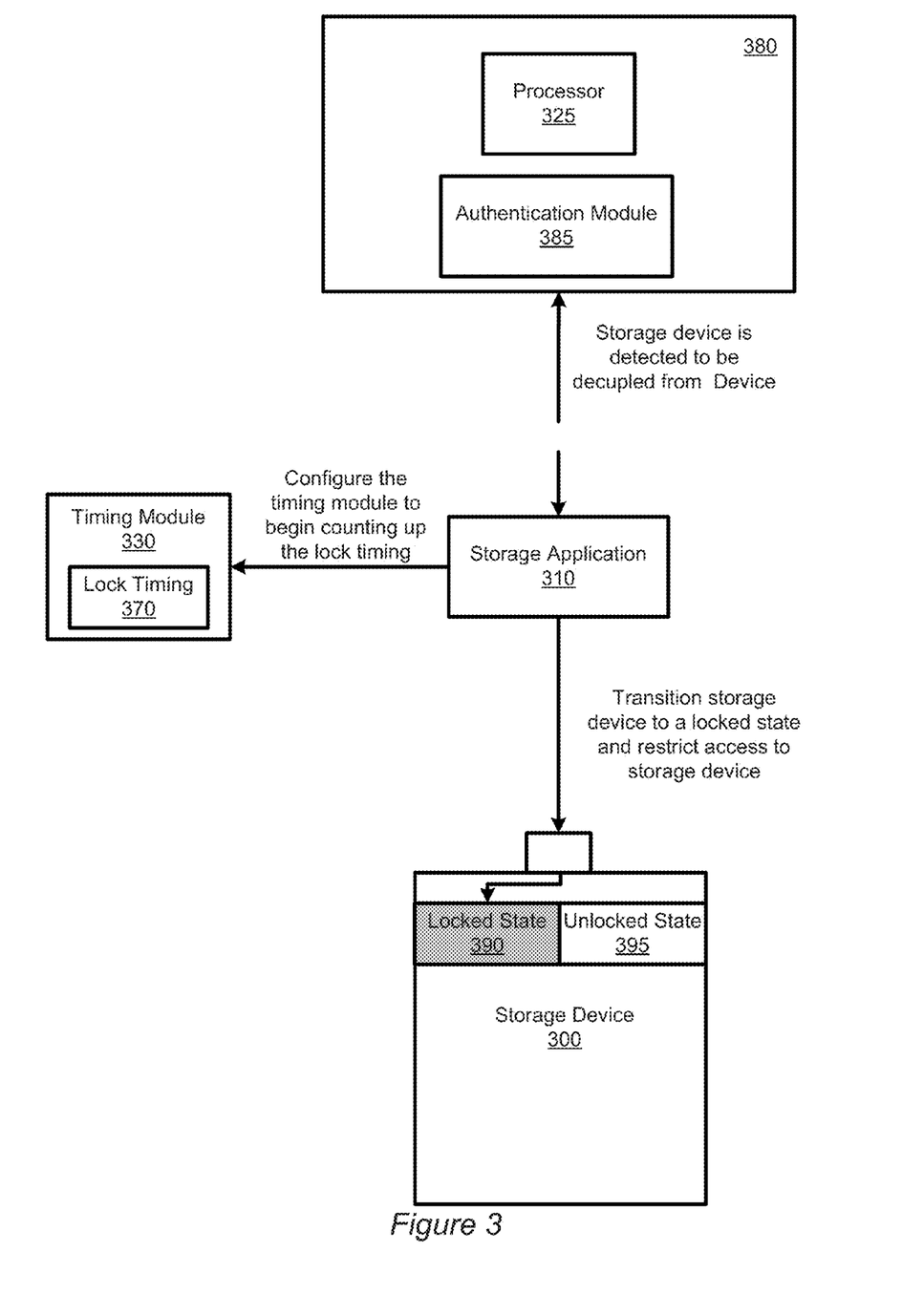
FIG. 3 illustrates a block diagram of a storage device transitioning into a locked state in response to decoupling from a device according to an embodiment of the invention.

FIG. 3 illustrates a block diagram of a storage device 300 transitioning into a locked state 390 in response to decoupling from a device 380 according to an embodiment of the invention. In one embodiment, a SATA cable initially couples the interface of the storage device 300 to a port of the device 380. Through the SATA cable, the storage device 300 is coupled to and interfaces with the device 380. In other embodiments, the cable can be any additional cable configured to couple the interface of the storage device 300 to the device 380.

As illustrated in FIG. 3, a storage application 310 of the storage device 300 can be configured to scan for the storage device 300 decoupling from the device 380. As noted above, the storage device 300 decouples from the device 380 when the interface of the storage device 300 ceases and/or loses communication with the device 380. Additionally, the interface ceases and/or loses communication with the device 380 when a cable or connection between the interface and a port or communication channel on the device 380 becomes decoupled or severed.

The cable and/or connection can become decoupled and/or severed when a cable connecting the interface of the storage device 300 to the device 380 becomes loose or is unfastened. In another embodiment, the storage device 300 ceases and/or loses communication with the device 380 in response to the storage device 300 and/or the device 380 losing power.

In one embodiment, the storage application 310 scans the interface and/or one or more ports or communication channels on the device 380 and determines that the SATA cable has become loose. As a result, the storage application 310 has determined that the storage device 300 has decoupled from the device 380. As shown in FIG. 3, in response to the storage application 310 detecting the storage device 300 decoupling from the device 380, the storage application 310 configures the storage device 300 to transition into a locked state 390. As noted above, when in the locked state 390, access to the storage device 300 and one or more content on the storage device 300 can be restricted.

The controller and/or the storage application 310 can instruct one or more components of the storage device 300 to power down when the storage device 300 is in the locked state 390. Additionally, the storage application 300 can instruct one or more of the components of the storage device 300 to reject communication with the device 380 or deny access to the device 380 while the storage device 300 is in the locked state 390. In one embodiment, the storage application 310 further sends an instruction to the device 380 for the device 380 to reset and/or reestablish the connection between the storage device 300 and the device 380 if the storage device 300 is re-coupled. The instruction can be a COMINIT instruction or signal.

Further, as shown in FIG. 3, the storage application 310 can additionally configure a timing module 330 of the storage device 300 to begin counting up to a lock timing 370 in response to the storage device 300 decoupling from the device 380. As noted above, the timing module 330 is a device and/or component of the storage device 300 configured to increment or count up in response to one or more instructions from the controller and/or the storage application 310. In one embodiment, the timing module 330 is a counter.

In one embodiment, the storage device 300 additionally includes a power supply. The power supply can include any device and/or component configured to supply power to one or more components of the storage device 300. In one embodiment, if power is lost in response to the storage device 300 decoupling from the device 380, one or more components of the storage device 300 can continue to receive power from the power supply so that the storage device 300 can continue to transition into the locked state 390 and the timing module 330 can begin to increment up to the lock timing 370.

Figure 4:
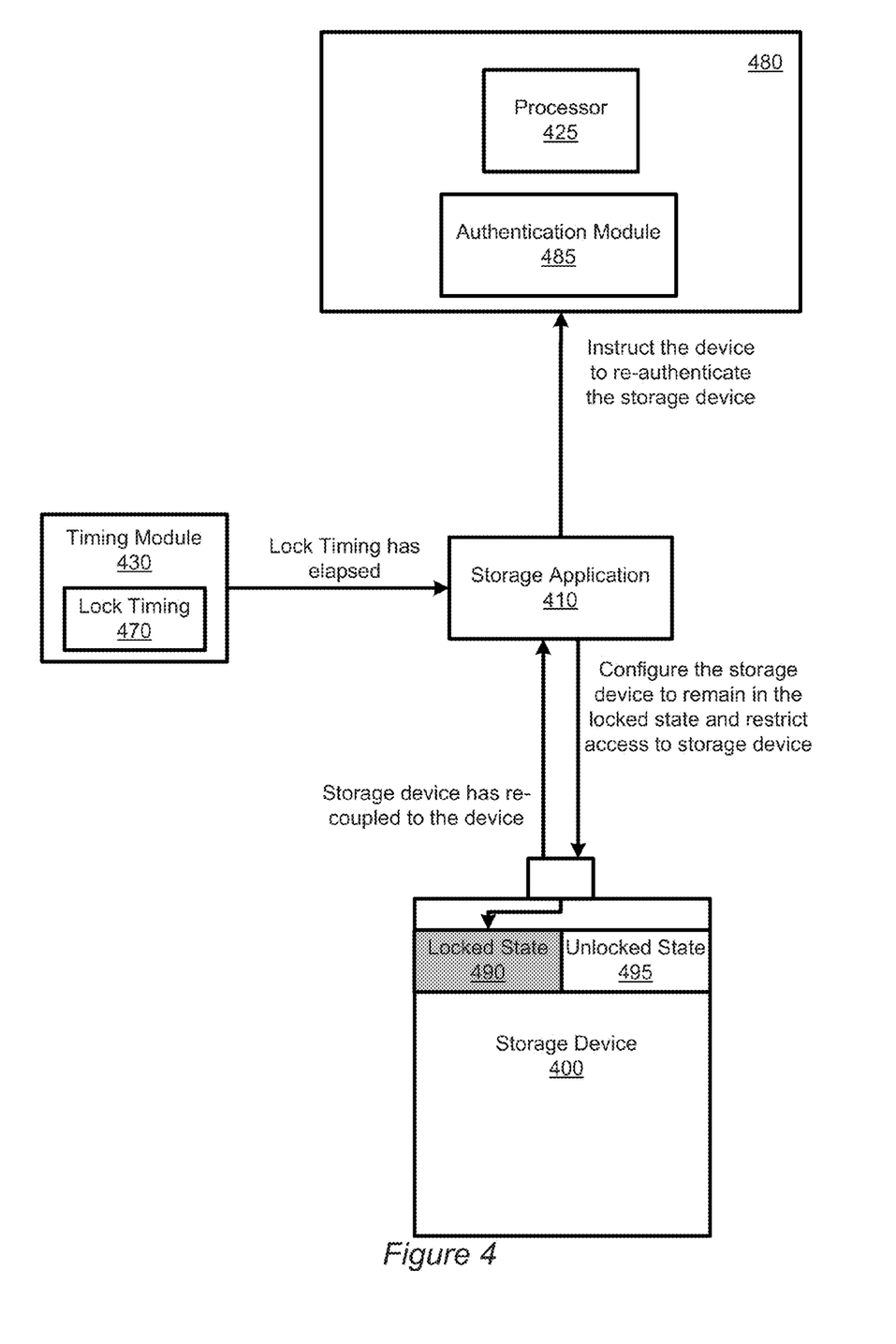
FIG. 4 illustrates a block diagram of a storage device re-coupling to a device according to an embodiment of the invention.

FIG. 4 illustrates a block diagram of a storage device 400 re-coupling to a device 480 according to an embodiment of the invention. As noted above, a timing module 430 of the storage device 400 is configured to increment and/or count up to a lock timing 470 in response to the storage device 400 decoupling from the device 480. Additionally, as illustrated in FIG. 4, while the storage device 400 is decoupled from the device 480, the storage device 400 is in a locked state 490.

In one embodiment, the timing module 430 determines that the lock timing 470 is predefined by the timing module 430 as a few microseconds and the timing module 430 begins to count from 0 up to the predefined microseconds. In other embodiments, the lock timing 470 can be defined by the device 480 or by a user to be any other value and/or time in addition to and/or in lieu of those noted above. While the timing module 430 is counting up to the lock timing 470, a storage application 410 coupled to the storage device 400 will scan an interface of the storage device 400 to determine whether the storage device 400 has re-coupled to the device 480. In one embodiment, the storage application 410 scans for a signal from the device 480 indicating that the connection has been reset. The signal can be a COMRESET and can be received from the device 480.

In one embodiment, the timing module 430 has incremented up to the lock timing 470. As shown in FIG. 4, in response to reaching the lock timing 470, the timing module 430 sends one or more signals and/or messages to the storage application 410, notifying the storage application 410 that the lock timing 470 has elapsed. Additionally, the storage application 410 scans for the COMRESET signal and/or any additional signal which can indicate that the interface has re-coupled to the device 480.

In one embodiment, the storage application 410 determines that a COMRESET signal was received, but the signal was received after the lock timing has elapsed. As a result, the storage application 410 configures the storage device 400 to remain in the locked state 490. As a result, access to the storage device 400 and one or more content on the storage device 400 continues to be restricted. Further, as illustrated in FIG. 4, the storage device 400 instructs the device 400 to re-authenticate the storage device 400.

As noted above, when the storage device 400 is being authenticated by the device 400, an authentication module 485 of the device 400 is configured to decrypt one or more encryptions of the storage device 400. One or more of the encryptions can include one or more encryption algorithms and/or one or more signatures. Additionally, the authentication module 485 can authenticate the storage device 400 using a decryption algorithm, a sequence of numbers and/or characters, and/or a signature key. In another embodiment, the authentication module 485 can utilize one or more hardware and/or software tokens to decrypt and authenticate the storage device 400.

Figure 5:
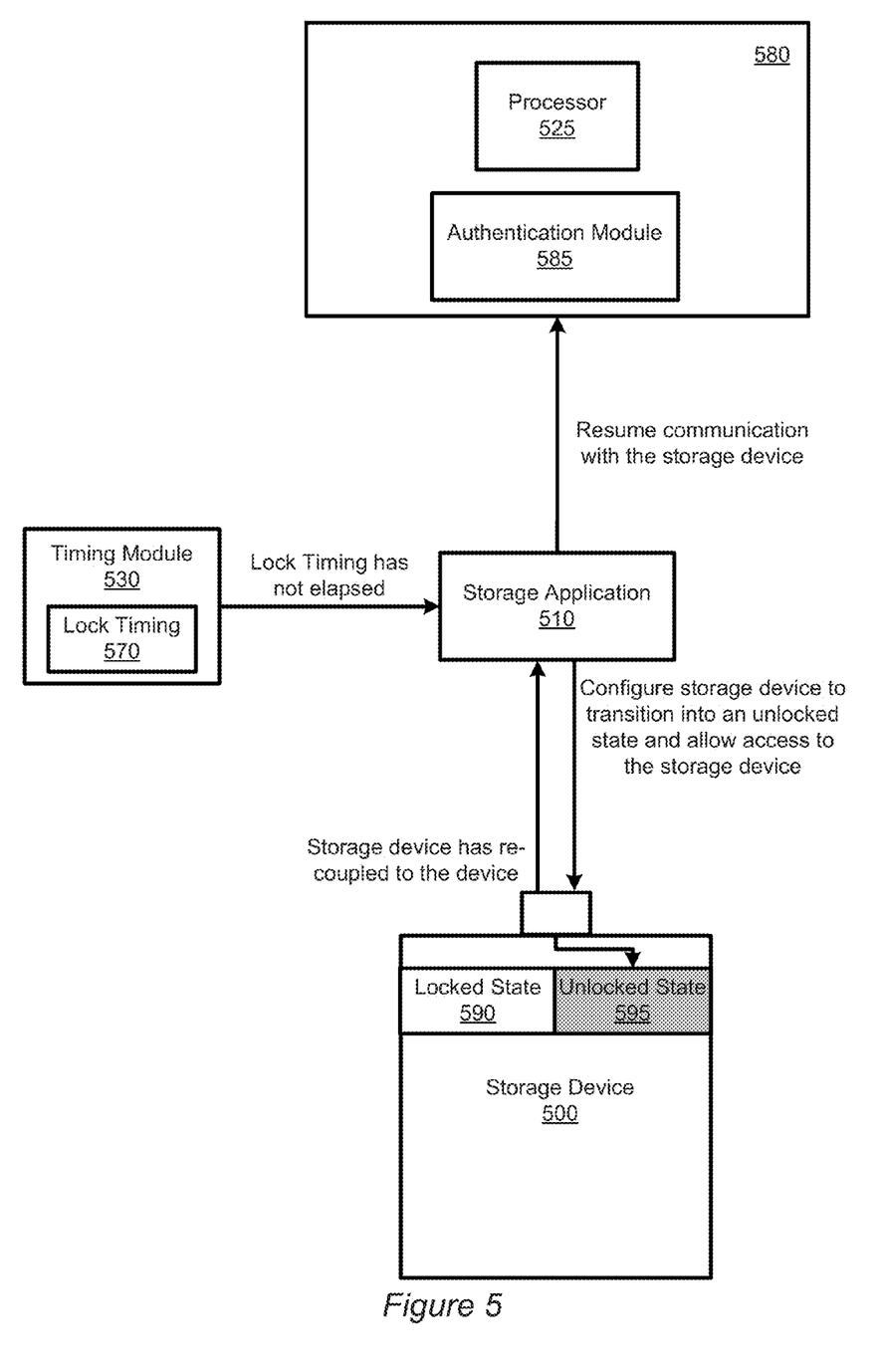
FIG. 5 illustrates a block diagram of a storage device re-coupling to a device according to another embodiment of the invention.

FIG. 5 illustrates a block diagram of a storage device 500 re-coupling to a device 580 according to another embodiment of the invention. As noted above, an interface of the storage device 500 can re-couple with one or more ports of the device 580 after the storage device 500 has decoupled from the device 580 and a timing module 530 can count up to a lock timing 570 while the storage device 500 is decoupled from the device 580. Additionally, the storage device 500 can decouple from the device 580 when a cable from the interface to the device 580 becomes loose or unfastened. The cable is a SATA cable or any additional cable configured to couple the interface to the device 580.

In one embodiment, the cable is re-secured and/or refastened to the interface of the storage device 500 and/or a port on the device 580. As a result, as illustrated in FIG. 5, the storage application 510 has scanned the interface of the storage device 500 and determined that the interface has re-coupled to the device 580. In one embodiment, the storage application 510 determines that the interface has re-coupled to the device in response to receiving a COMRESET signal or instruction from the device. The COMRESET can be sent from the device 580 through the interface of the storage device 500.

As a result, the storage application 510 determines that the storage device 500 has re-coupled to the device 580. Additionally, in response to the storage device 500 re-coupling to the device 580, the storage application 510 polls the timing module 530 to determine whether the timing module 530 has reached the lock timing 570.

In one embodiment, in response to the poll, the timing module 530 notifies the storage application 510 that the lock timing 570 has not elapsed. As a result, as illustrated in FIG. 5, the storage application 510 configures the storage device 500 to transition into an unlocked state 595 and allow accessed to the storage device 500. As noted above, when the storage device 500 is in an unlocked state 595, the storage device 500 and/or one or more content on the storage device 500 can be accessed by the device 580.

Additionally, when transitioning to the unlocked state 595, the storage application 510 and/or a controller of the storage device 500 configures one or more components and/or devices of the storage device 500 to power on and grant access to the device 580. In another embodiment, the storage application 510 and/or the controller send one or more instructions to components of the storage device 500 to resume communication with the device 580.

Figure 6:
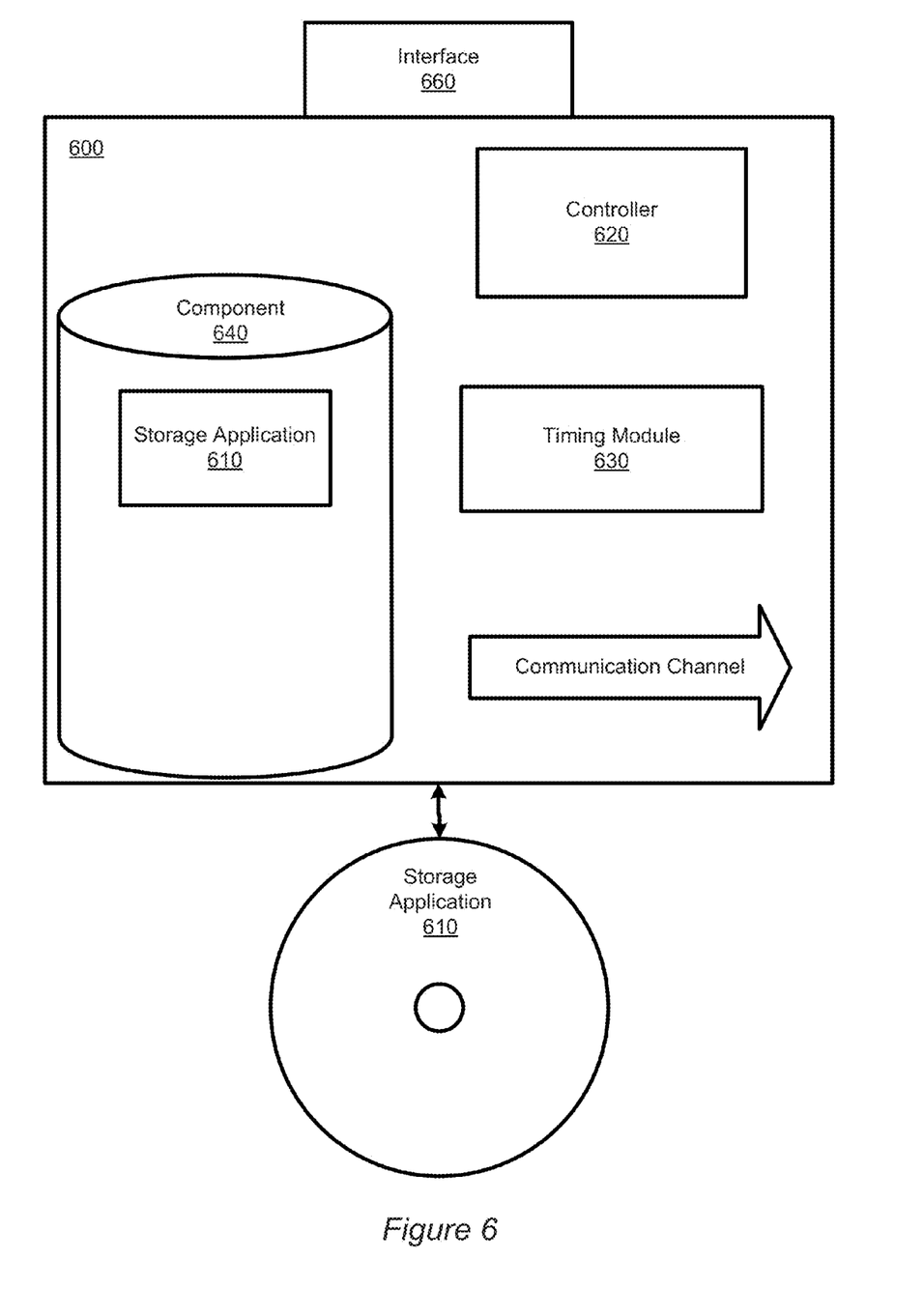
FIG. 6 illustrates a storage device with an embedded storage application and a storage application stored on a removable medium being accessed by the storage device according to an embodiment of the invention.

FIG. 6 illustrates a storage device 600 with an embedded storage application 610 and a storage application 610 stored on a removable medium being accessed by the storage device 600 according to an embodiment of the invention. For the purposes of this description, a removable medium is any tangible apparatus that contains, stores, communicates, or transports the application for use by or in connection with the storage device 600.

As noted above, in one embodiment, the storage application 610 is firmware that is embedded into one or more components of the device 600 as ROM. In other embodiments, the storage application 610 is a software application which is stored and accessed from a hard drive, a compact disc, a flash disk, a network drive or any other form of computer readable medium that is coupled to the storage device 600.

Figure 7:
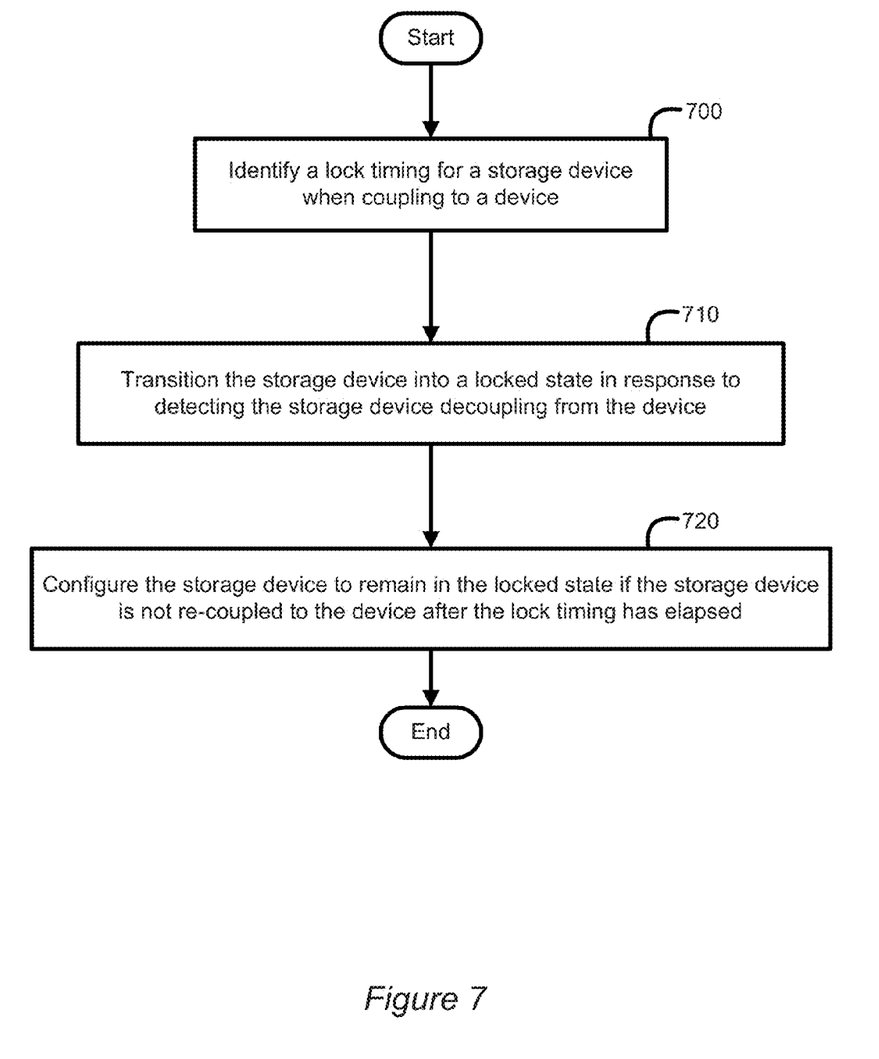
FIG. 7 is a flow chart illustrating a method for managing a storage device according to an embodiment of the invention.

FIG. 7 is a flow chart illustrating a method for managing a storage device according to an embodiment of the invention. The method of FIG. 7 uses a storage device with an interface, a controller, a lock timing, a timing module, and a storage application. In other embodiments, the method of FIG. 7 uses additional components and/or devices in addition to and/or in lieu of those noted above and illustrated in FIGS. 1, 2, 3, 4, 5, and 6.

As noted above, the storage device is a device and/or a component configured to store one or more content. Additionally, the storage device can enter and/or transition between one or more states. One or more of the states can include an unlocked state and a locked state. When in the unlocked state, access to the storage device and/or one or more content included on the storage device can be granted.

Additionally, when in the locked state, access to the storage device and/or one or more content on the storage device can be restricted. In one embodiment, when in the locked state, the storage device can be encrypted. The storage device can be encrypted with one or more sequence of characters and/or numbers using one or more encryption algorithms and/or signatures. Further, the storage device can enter and/or transition into one or more of the states in response to coupling or decoupling to a device.

As noted above, the device can include any device and/or component which an interface of the storage device can couple to. In one embodiment, the device is a computing machine. In another embodiment, the device is a cellular device and/or a media device. When coupling to the device, an interface of the storage device couples to a port or a communication channel of the device.

In one embodiment, when the storage device couples to a device a first time, a storage application can be instructed by the controller to prompt the device to authenticate the storage device. The storage application instructs the device to authenticate the storage device using an authentication module.

The authentication module is a hardware and/or software decryption device configured to decrypt an encryption of the storage device when authenticating the storage device. In one embodiment, the authentication module uses a sequence of characters and/or numbers, one or more decryption algorithms, and/or one or more signature keys to decrypt the storage device. In another embodiment, the authentication module utilizes one or more hardware and/or software tokens to decrypt the storage device.

Once the storage device has been decrypted and authenticated by the authentication module, the storage application can configure the storage device to transition into an unlocked state. When transitioning into the unlocked state, the storage application can send one or more instructions and/or commands to one or more components of the storage device to power on. Additionally, the storage application can send one or more instructions for the components to communicate with the device and grant access to the device.

Further, in response to the storage device unlocking when coupling to the device, a lock timing for the storage device can be identified 700. As noted above, the lock timing can be a time and/or value utilized by a timing module of the storage device. The lock timing can be predefined by the timing module, the device, and/or one or more components of the device or the storage device. In another embodiment, the lock timing can be defined by a user accessing the device or the storage device.

As noted above, the lock timing can be stored on the timing module. The timing module is a component of the storage device which includes a counter and is configured to count up to the lock timing. The timing module can be instructed by the controller and/or the storage application to begin to count. Additionally, the timing module can send one or more instructions to the storage application once the timing module has counted up to the lock timing.

While the storage application is coupled to the device, the storage application can monitor and/or poll the interface of the storage device to determine if the storage device becomes decoupled from the device. If the storage application detects the interface decoupling from one or more ports or communication channels of the device, the storage application will proceed to configure the storage device to transition into the locked state 710.

Additionally, in response to the storage device decoupling from the device, the storage application will instruct the timing module to begin counting up to the lock timing. In one embodiment, the lock timing can be defined as less than a second or as a few microseconds or milliseconds. In other embodiments, the lock timing can be defined as any additional time or value in addition to and/or in lieu of those noted above.

Once the timing module has counted up to the lock timing, the timing module will send one or more signals to the storage application specifying that the lock timing has exceeded. Additionally, while the timing module is counting up to the lock timing, the storage application will scan the interface of the storage device to detect if the storage device has re-coupled to the device. If the storage device determines that the interface of the storage device has re-coupled to the device, the storage application will determine that the storage device has re-coupled to the device.

In one embodiment, if the storage application has been notified by the timing module that the lock timing has elapsed before the storage device has re-coupled to the device, the storage application will instruct the storage device to continue to remain in the locked state 720. Additionally, the storage application will prompt the device to re-authenticate the storage device before access to the storage device and contents on the storage device can be accessed.

In another embodiment, if the storage application determines that the storage device has re-coupled to the device before being notified that the lock timing has exceeded, the storage application will configure the storage device to transition into an unlocked state. Access to the storage device and/or one or more content on the storage device can then be granted. The method is then complete or the controller can continue to instruct the storage application to manage the storage device in response to the storage device coupling and/or decoupling from a device. In other embodiments, the method of FIG. 7 includes additional steps in addition to and/or in lieu of those depicted in FIG. 7.

Figure 8:
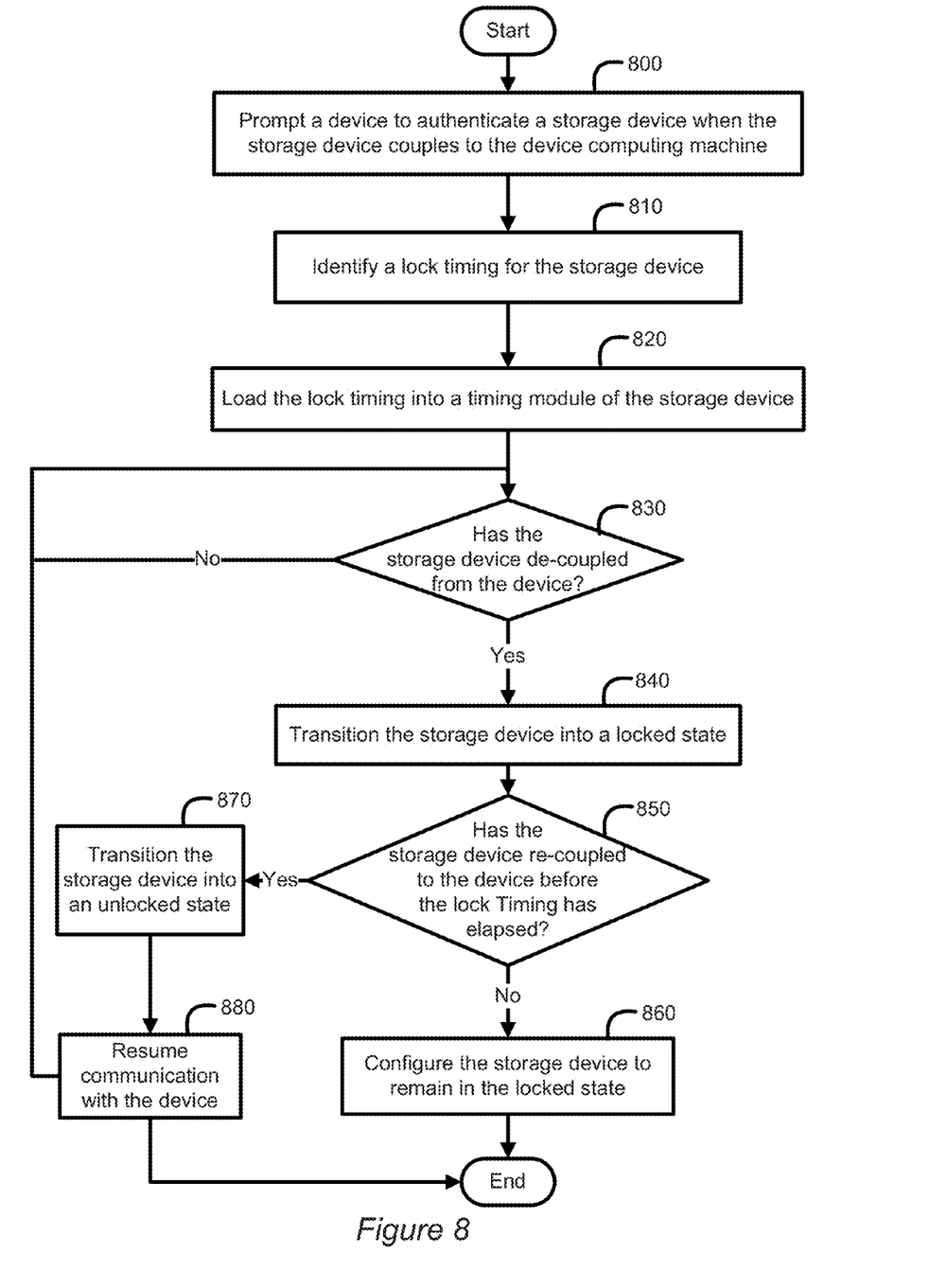
FIG. 8 is a flow chart illustrating a method for managing a storage device according to another embodiment of the invention.

FIG. 8 is a flow chart illustrating a method for managing a storage device according to another embodiment of the invention. Similar to the computer implemented method of FIG. 7, the method of FIG. 8 uses a storage device coupled to an interface, a controller, a lock timing, a timing module, and a storage application. In other embodiments, the method of FIG. 8 uses additional components and/or devices in addition to and/or in lieu of those noted above and illustrated in FIGS. 1, 2, 3, 4, 5, and 6.

As noted above, a controller can send one or more instructions for a storage application to manage a storage device. When managing the storage device, the storage application can initially scan an interface of the storage device to detect if the storage device has coupled to a device. In another embodiment, the interface can notify the storage application in response to coupling to one or more ports or communication channels on the device.

As noted above, when the storage device is not coupled to a device, the storage device can be in a locked state. Additionally, when the storage device is in a locked state, the storage device can be encrypted utilizing one or more encryption algorithms and/or signatures. Once the storage application has determined that the storage device is coupled to a device, the storage application can prompt the device to authenticate the storage device 800.

Additionally, when authenticating the storage device, an authentication module of the device can decrypt the storage device using a decryption algorithm, a sequence of characters and/or numbers, a signature key, and/or a hardware/software token. Once the encryption on the storage device has been decrypted and the storage device has been authenticated, the storage application can configure the storage device to transition from the locked state to an unlocked state.

Additionally, the storage application can identify a lock timing for the storage device 810. In one embodiment, the lock timing is defined as a few microseconds or milliseconds. Once the lock timing has been identified, the lock timing can be loaded and/or stored on the timing module 820. As noted above, the timing module is a device and/or component of the storage device which can be configured by the storage application to count up to the lock timing.

Once the timing module has been configured with the lock timing, the storage application can then proceed to determine whether the storage device has de-coupled from the device 830. When determining whether the storage device has de-coupled from the device, the storage application can scan and/or poll the interface of the storage device to determine whether the interface is coupled to one or more ports or communication channels on the device.

If the storage device is not detected to decouple from the device, the storage application will continue to scan for the storage device decoupling from the device 830. In another embodiment, if the storage application determines or is notified that the storage device has become decoupled from the device, the storage application will configure the storage device to transition or enter the locked state 840. When configuring the storage device to transition into the locked state, the storage application instructs one or more components of the storage device to power down, cease communication, or restrict communication with the device.

Further, while the storage device is decoupled from the device, the storage application can instruct the timing module to begin counting or incrementing up to the lock timing. In one embodiment, the timing module will notify the storage application if the lock timing has elapsed. In another embodiment, the storage application will poll the timing module to determine whether the lock timing has elapsed.

Additionally, while the timing module is counting up, the storage application can scan and/or poll the interface to determine if the storage device has re-coupled to the device before the lock timing has elapsed 850. In one embodiment, if the storage device determines that the lock timing has elapsed before the storage device has re-coupled to the device, the storage application will configure the storage device to continue to remain in the locked state 860. Further, the device can be prompted to re-authenticate the storage device.

In another embodiment, if the storage application determines that the storage device has re-coupled to the device before being notified or determining that the lock timing has elapsed, the storage application will configure the storage device to transition from the locked state to the unlocked state 870. When transitioning to the unlocked state, the storage application can instruct one or more components or devices of the storage device to power on or grant access to the device.

In one embodiment, the storage application then instructs one or more of the components or devices to resume communication with the device 880. The method is then complete or the storage application can continue to manage the storage device in response to the storage device coupling or decoupling from the device. In other embodiments, the method of FIG. 8 includes additional steps in addition to and/or in lieu of those depicted in FIG. 8.

By transitioning a storage device into a locked state in response to decoupling from the computing machine, access to the storage device and one or more content on the storage device can securely be managed. Additionally, by configuring the storage device to remain in the locked state if the storage device does not re-couple to the computing machine before a lock timing has elapsed, a user friendly and secure environment can be created for a user.

What is claimed is:

1. A method for managing a storage device comprising:
   identifying a lock timing for the storage device when coupling to a device;
   transitioning the storage device into a locked state in response to detecting the storage device decoupling from the device; and
   configuring the storage device to remain in the locked state if the storage device is re-coupled to the device after the lock timing has elapsed.

2. The method for managing a storage device of claim 1 further comprising configuring a timing module to count up to the lock timing in response to the storage device decoupling from the device.

3. The method for managing a storage device of claim 1 wherein access to the storage device is restricted while the storage device is in the locked state.

4. The method for managing a storage device of claim 1 further comprising configuring the storage device to transition into an unlocked state in response to the storage device re-coupling to the device before the lock timing has elapsed.

5. The method for managing a storage device of claim 4 wherein the storage device resumes communication with the device when the storage device transitions into the unlocked state.

6. The method for managing a storage device of claim 1 further comprising prompting the device to re-authenticate the storage device when the storage device is re-coupled to the device after the lock timing has elapsed.

7. A storage device comprising:
   a controller;
   a timing module configured to count to a lock timing in response to the storage device decoupling from a device;
   a storage application executable by the controller from a computer readable memory and configured to transition the storage device to a locked state in response to the storage device de-coupling from the device and configure the storage device to remain in the locked state if the storage device is re-coupled to the device after the lock timing has elapsed.

8. The storage device of claim 7 wherein the timing module is configured to identify the lock timing in response to the storage device coupling to the device.

9. The storage device of claim 7 wherein the lock timing is defined by at least one from the group consisting of a user, the timing module, and the device.

10. The storage device of claim 7 wherein the device includes an authentication module configured to authenticate the storage device with the device in response to the storage device coupling to the device.

11. The storage device of claim 7 further comprising an interface configured to couple the storage device to the device.

12. The storage device of claim 11 wherein the interface includes at least one from the group consisting of an IDE interface, a SATA interface, a SAS interface, a PCIe interface, an ESATA interface, a USB interface, a firewire interface, and a serial interface.

13. A non-transitory computer-readable program in a computer-readable medium comprising:

a storage application configured to identify a lock timing for a storage device in response to coupling to a device;

wherein the storage application is additionally configured to transition the storage device to a locked state if the storage device is detected to be decoupled from the device; and wherein the storage application is further configured to instruct the storage device to remain in the locked state if the storage device is not re-coupled to the device before the lock timing has elapsed.

14. The non-transitory computer-readable program in a computer-readable medium of claim 13 wherein the storage application is a firmware of the storage device.

15. The non-transitory computer-readable program in a computer-readable medium of claim 13 wherein a timing module on the storage device begins to count up to the lock timing when the storage device is detected to be decoupled from the device and the timing module notifies the storage application that the lock timing has elapsed if the timing module has counted up to the lock timing.

* * * * *